United States Patent [19]

Hampshire

[11] 4,350,196
[45] Sep. 21, 1982

[54] NON-PNEUMATIC STRUCTURALLY RESILIENT INTEGRATED WHEEL-TIRE

[75] Inventor: William J. Hampshire, Peninsula, Ohio

[73] Assignee: The Goodyear Tire & Rubber Company, Akron, Ohio

[21] Appl. No.: 125,428

[22] Filed: Feb. 28, 1980

Related U.S. Application Data

[63] Continuation-in-part of Ser. No. 879,586, Feb. 21, 1978, abandoned, which is a continuation-in-part of Ser. No. 722,572, Sep. 13, 1976, abandoned.

[51] Int. Cl.³ ............................................. B60B 9/00
[52] U.S. Cl. .................................... 152/5; 301/63 PW
[58] Field of Search .......................... 152/5, 7, 12, 323; 301/5 R, 63 PW; 46/221

[56] References Cited

U.S. PATENT DOCUMENTS

| | | | |
|---|---|---|---|
| D. 186,592 | 11/1959 | Barnes | 301/63 PW X |
| D. 204,368 | 4/1966 | Tersch | D12/204 X |
| 1,795,472 | 3/1931 | Budd | 301/5 R X |
| 2,073,347 | 3/1937 | Leathers | |
| 2,878,070 | 3/1959 | Nojima | |
| 3,107,947 | 10/1963 | Hultersturm | |
| 3,212,594 | 10/1965 | Scott | |
| 3,492,055 | 1/1970 | Frankland | |
| 3,590,897 | 7/1971 | Bragdon | 152/12 |
| 3,646,983 | 3/1972 | Van Lieshoud | 152/323 |
| 3,698,461 | 10/1972 | Markow | 152/5 |
| 3,763,957 | 10/1973 | Hunt | 301/5 R X |
| 3,821,995 | 7/1974 | Aghnides | 180/6.2 |
| 3,861,435 | 1/1975 | Vincent et al. | 152/5 |
| 3,870,372 | 3/1975 | Knipp | 301/63 PW |

FOREIGN PATENT DOCUMENTS

| | | | |
|---|---|---|---|
| 1007671 | 3/1952 | France | 152/323 |
| 1278131 | 10/1961 | France | 152/7 |
| 1315160 | 4/1973 | United Kingdom | 301/5 R |

*Primary Examiner*—F. J. Bartuska
*Attorney, Agent, or Firm*—Kenyon & Kenyon

[57] ABSTRACT

This invention relates to a light weight and strong molded resilient fiber reinforced plastic automotive wheel structure having the mechanical functions and riding performance characteristics of conventional pneumatic tire and wheel assemblies at loads below the design load of the wheel structure, and whose mechanical functions and safety characteristics are superior to those of conventional pneumatic tire and wheel assemblies at loads above the design load of the wheel structure.

52 Claims, 11 Drawing Figures

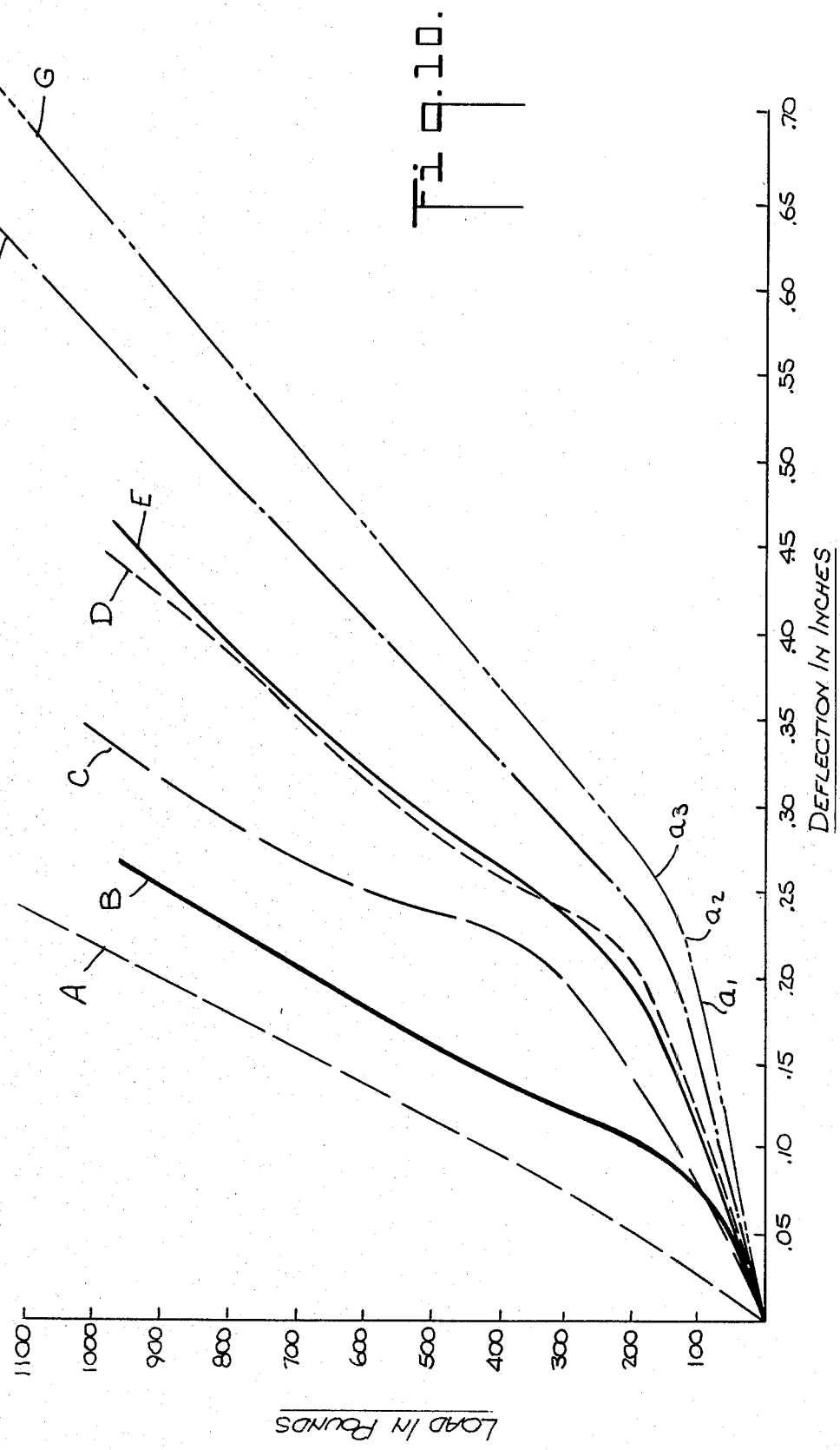

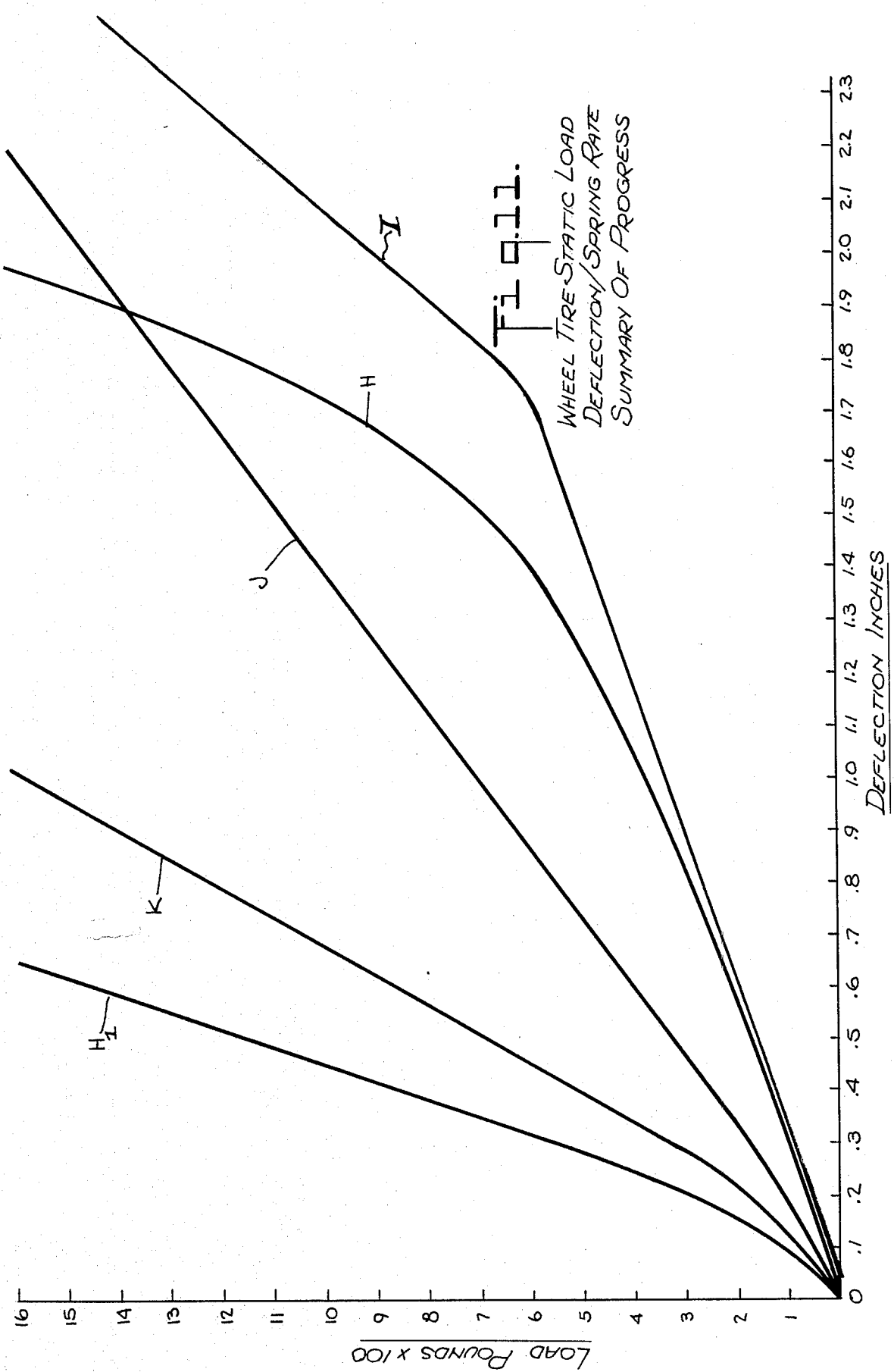

NON-PNEUMATIC STRUCTURALLY RESILIENT INTEGRATED WHEEL-TIRE

RELATED APPLICATIONS

This application is a continuation-in-part of U.S. patent application Ser. No. 879,586, filed Feb. 21, 1978, now abandoned, which in turn is a continuation-in-part of U.S. patent application Ser. No. 722,572, filed Sept. 13, 1976 now abandoned.

BACKGROUND OF THE INVENTION

1. Field of the Invention

This invention relates to an automotive wheel structure. More particularly, this invention relates to a light weight and strong molded resilient fiber reinforced plastic automotive wheel structure having the mechanical functions and riding performance characteristics of conventional pneumatic tire and wheel assemblies at loads below the design load of the wheel structure, and whose mechanical functions and safety characteristics are superior to those of conventional pneumatic tire and wheel assemblies at loads above the design load of the wheel structure.

2. Prior Art

Heretofore, automotive vehicles have used a two component assembly which comprises a pneumatic tire positioned around a metal wheel. These conventional wheel assemblies suffer from a number of inherent disadvantages. One such disadvantage results from the two piece construction, which requires that the manufacturer of automotive vehicles purchase wheels from one supplier, and the pneumatic tires from another. Consequently, it is often necessary that the pneumatic tire or the wheel be manufactured to specifications to insure compatibility of the tire and wheel components. Thus, purchasing costs, including higher freight costs, cost of mounting pneumatic tires on the wheels, are maximized to the vehicle manufacturer, and, hence, to its customers.

A further disadvantage of the conventional pneumatic tire and wheel assembly resides in the excessive weight of the metal wheel, which increases the overall weight of the automotive vehicle. The increased vehicle weight usually results in decreased gas mileage.

Another disadvantage of the conventional pneumatic tire and wheel assembly resides in the pneumatic tire. Conventional pneumatic tires are subject to air loss when the tire is punctured by stones, metal objects, and other sharp objects which are often found on roadways. Punctured pneumatic tires cannot support the automotive vehicle unless repaired by those trained in the repair of punctured pneumatic tires. Such punctures often occur on the open highway, which requires that the automotive vehicle carry a spare pneumatic tire and wheel assembly, which decreases the space available for cargo and which adds significantly to the weight of the vehicle.

Thus, for many years, there has been a need for a non-pneumatic tire and wheel assembly for use in passenger cars and in off the road vehicles, such as farm and military equipment, as well as in aircraft, trucks and certain commercial vehicles. Prior efforts over the last several decades have generally resulted in substantially rigid structures that did not achieve the mechanical functions and the riding performance characteristics of conventional pneumatic tire and wheel assemblies.

An example of one prior effort is U.S. Pat. No. 2,016,095 issued Oct. 1, 1935 in which a solid tire tread is cured on stiffening hoops made of tough spring steel tubes which structure is then affixed to a disc wheel formed of sheet metal.

U.S. Pat. No. 3,807,474 discloses a high density, linear polyethylene hub structure carrying a locking rim onto which is molded a tire which may be solid or hollow having a cord insert of resilient material. The hub structure disclosed is of substantially rigid material, the tires providing the resilience.

British Pat. No. 1,013,214 discloses a vehicle wheel including a non-pneumatic tire having a bead clamped between substantially radially extending flanges provided on the rim, fabricated presumably of rigid metal. The resilence of the structure is provided by the means affixing the tread to the rim as well as the tread material itself.

All of the above prior attempts to provide a non-pneumatic tire and wheel assembly have failed to provide such a device having sufficient utility to make it commercially feasible. None of the prior art devices has achieved the mechanical functions and riding performance characteristics of a conventional pneumatic tire and wheel assembly.

Accordingly, it is an object of this invention to provide an automotive wheel structure having the mechanical functions and riding performance characteristics similar to a conventional pneumatic tire and wheel assembly at loads up through the design load of the wheel structure and tire.

It is another object of this invention to provide a wheel structure and integral non-pneumatic tire tread having mechanical functions and safety charcteristics that are superior to those of a conventional pneumatic tire and wheel assembly at loads above the design load of the wheel structure and tire.

It is still another object of this invention to provide a molded resilient fiber reinforced plastic automotive wheel structure and integral non-pneumatic tire tread which is of unitary construction, and which is light of weight and of high strength.

It is a further object of this invention to provide a wheel structure and integral non-pneumatic tire tread to simulate the appearance of a conventional tire and wheel assembly.

It is yet another object of this invention to provide a wheel structure and integral non-pneumatic tire tread having the mechanical functions and riding characteristics of a conventional pneumatic tire, but also having a lower rolling resistance.

Other objects and advantages of this invention will become apparent to those skilled in the art from the description to follow when read in conjunction with the drawings appended hereto.

BRIEF SUMMARY OF THE INVENTION

The above-mentioned objects are achieved by the present invention which provides a composite wheel structure having a design load P, an outside radius $R_o$, a structural width W, a static deflection d, a static load radius SLR, and a structural radius $R_t$, and which includes two essential structural features. As one essential structural component, the structure includes a first frustum of a right circular cone or ogive, the larger diameter outside edge of which has a thickness $t_2$, and the smaller inside edge of which has a thickness $t_1$. As the second essential structural component, the structure includes a first toroidal segment having a radius of curvature $R_1$, and a structural thickness t. The first toroidal segment has an outer edge of thickness $t_1$ which is attached continuously and tangentially to the smaller diameter inside edge of the first frustum and has an inner edge of thickness, t, which is attached continuously and tangentially to the larger diameter outer edge of a radial mounting disc adapted at its central portion to be affixed to an axle. The structural design parameters of the wheel structure of this invention, i.e., P, $R_o$, d, SLR, $R_t$, W, $R_1$, t, $t_1$ and $t_2$, are selected such that the increase in deflection per increasing load for said structure is similar to that of a conventional pneumatic tire at loads below the design load P of said structure, and the increase in deflection per increasing load is less than that of a conventional pneumatic tire at loads above the design load P of the structure, where the changes in these deflection characteristics occur at about the design load of the structure. These deflection characteristics cause the wheel structure of this invention to achieve the mechanical functions and riding characteristics of conventional pneumatic tire and wheel assemblies at loads up to about the design load of the structure, and to achieve mechanical functions and safety performance characteristics that are superior to those of conventional tire and wheel assemblies at loads above the design load of the structure.

Other embodiments of this invention include additional structural components. One such embodiment includes a second toroidal segment and a third toroidal segment which cooperate to interconnect the larger diameter outer edge of the mounting disc and the inner edge of the first toroidal segment. The second toroidal segment has a radius of curvature $R_2$ and has an inside edge thickness of $t_3$. The outer edge of the second toroidal segment is attached continuously and tangentially to the inner edge of the first toroidal segment and the inner edge is attached continuously and tangentially to the outer edge of the third toroidal segment.

The third toroidal segment has a radius of curvature $R_4$. The segment has an outside edge of thickness $t_3$ and an inside edge of thickness $t_4$ and is preferably of tapered cross-sectional symmetry such that $t_4$ is greater than $t_3$. The outside edge is attached continuously and tangentially to the smaller diameter edge of the second toroidal segment, and the inside edge is attached continuously and tangentially to the larger diameter edge of the disc. The structural parameters of this embodiment i.e. P, $R_o$, d, SLR, $R_t$, W, $R_1$, t, $t_1$, $t_2$, $t_3$, $t_4$, $R_2$ and $R_4$, are also selected to achieve the mechanical function and riding characteristics as described above.

Still another embodiment of the wheel structure of this invention includes a second frustum of a right circular cone or ogive which either interconnects the second and third toroidal segments of the embodiment described above or which replaces the second toroidal segment described above in the foregoing embodiment. The second frustum has an over-all thickness of $t_3$. In the former case, the larger diameter outer edge of the second frustum is continuously and tangentially attached to the inner edge of the second toroidal segment and the smaller diameter inner edge of the second frustum is continuously and tangentially attached to the outer edge of the third toroidal segment. In the latter case, the outer edge is attached continuously and tangentially to the inner edge of the first toroidal segment, and the inner edge is attached continuously and tangentially to the outer edge of the third toroidal segment. The structural parameters, i.e., P, $R_o$, d, SLR, $R_t$, W, $R_1$, t, $t_1$, $t_2$, $t_3$, $t_4$, $R_2$ and $R_4$, of this embodiment, are also selected such that the embodiment exhibits the deflection characteristics discussed hereinabove.

Still another embodiment would include structurally designed openings in the mounting disc inside of the first toroidal element $R_1$ for brake cooling or styling reasons.

Each of the above described embodiments of the wheel structure of this invention may also include an edge element which is attached continuously and tangentially at one edge to the larger diameter outside edge of the first frustum. The edge element has a width $W_e$, and a thickness $t_2$ at the edge of the element which is attached to the first frustum. The edge of the edge element opposite to the edge of attachment to the first frustum is of thickness $t_e$. As discussed above, the structural design parameters of this embodiment, i.e., P, $R_o$, d, SLR, $R_t$, $R_1$, t, $t_1$, $t_2$, $t_3$, $t_4$, $R_2$ $t_e$, $R_4$ and $W_e$ are selected such that the above described deflection characteristics are achieved.

The above described structural components of the wheel structure of this invention are preferably constructed of visco-elastic multi-axially strength oriented plastic materials, although other materials such as metals may be used. Visco-elastic plastic materials are plastic materials that recover slowly from deflection which causes them to have a natural damping effect when subjected to a series of deflections. Such materials include polymers of epoxy, polyester, urethane, acrylic, silicone, nylon, phenolic, aramid, propylene and other resinous plastics.

Visco-elastic polymer plastic materials are multi-axially strength oriented when these materials have been strengthened or reinforced either by altering the alignment of molecules within the plastic using conventional techniques such as pre-stressing under heat, or by the addition of reinforcing materials such as fibers of fiber glass, carbon, aramid and the like, in which the individual fibers are in selected multi-axial alignment. Such reinforced visco-elastic plastic materials and their methods of production are well known, and any of these materials processing adequate physical strength properties can be used.

In the preferred embodiments of this invention, the visco-elastic plastic material is reinforced by the addition of structurally oriented long fibers. For example, an acceptably reinforced plastic material can be conveniently prepared by the preforming process described in the inventor's U.S. Pat. No. 4,100,241 employing the machine described in the inventor's U.S. Pat. No. 4,069,000.

While not an essential component, the wheel structure of this invention preferably includes a ground engaging tire tread. The tire tread is affixed to the outside surface of the wheel structure, such that when the structure is under load deflection, the tread or a portion thereof forms a substantially flat footprint area which increases the traction. The tread is preferably solid, but may contain one or more openings or cavities or may be hollow at the discretion of the designer.

In the preferred embodiments of this invention, the thickness T of the tread can vary from about t to about 7t, where t is the structural thickness of the first toroidal segment. The width of the tread is approximately equal to $W_e + W + R_1 \cos \phi$ where $W_e$ is the width of the edge element of the wheel structure, W is the width of the structural extension and is not greater than $R_1$, and $\phi$ is from about 35° to 65°.

The tread is composed of an elastomeric material. Illustrative of such elastomeric material are natural rubbers, synthetic rubbers, rubber compositions used in the construction of treads for conventional pneumatic tires, and synthetic elastomeric materials such as polyurethane.

While the primary purpose of the tread is to provide a substantially flat footprint area for increased traction, the tread can also provide protection for various parts of the wheel structure. For example, a portion of the tread can be attached to the outer surface of one or more of the toroidal segments of the structure. This protects the wheel structure from abrasion by curbs, stones, and other like abrasive objects which could contact the outer surface of the structure. Similarly, a portion of the tread can encase a portion of the edge element, likewise protecting the element from abrasion from the abrasive pavement, and like abrasive surfaces that may contact the wheel structure while it is being used.

In another aspect this invention is directed to a vehicle which incorporates the wheel structure of this invention. The vehicle will usually include two or more axles to which the inner portion of the radial mounting disc of the wheel structure is attached. In certain vehicles such as a passenger car, a single wheel structure will be attached to each end of an axle. However, it should be appreciated that in other vehicles which are designed to carry heavier loads, more than one wheel structure of this invention can be attached to the end of an axle. Such vehicles include on and off the road vehicles such as trucks, trailers, airplanes, tractors, earth movers, caterpillars and the like. The wheel structure can be attached either with the open face of the structure facing outward or facing toward the vehicle. However, in most cases the open side will face the vehicle in order to more closely simulate the appearance of a conventional pneumatic tire.

BRIEF DESCRIPTION OF THE DRAWINGS

A more complete appreciation of the invention and the attendant advantages thereof will be more readily apparent as the same becomes better understood by reference to the following detailed description when considered in connection with accompanying drawings wherein:

FIG. 10 is a plot of load versus deflection for certain embodiments of the invention which illustrates the deflection characteristics of the wheel structure.

FIG. 11 is a plot of load versus deflection which compares the deflection characteristics of the embodiments of FIGS. 1 to 5 with those of a conventional pneumatic tire and a conventional high pressure spare.

DESCRIPTION OF THE PREFERRED EMBODIMENTS

Figure 1:
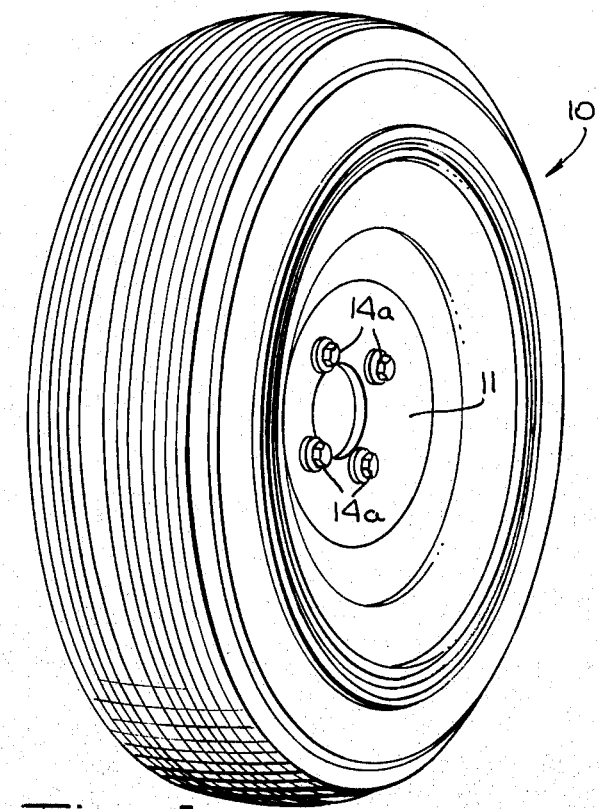
FIG. 1 is a front isometric view of a wheel assembly embodying the present invention.
Figure 2:
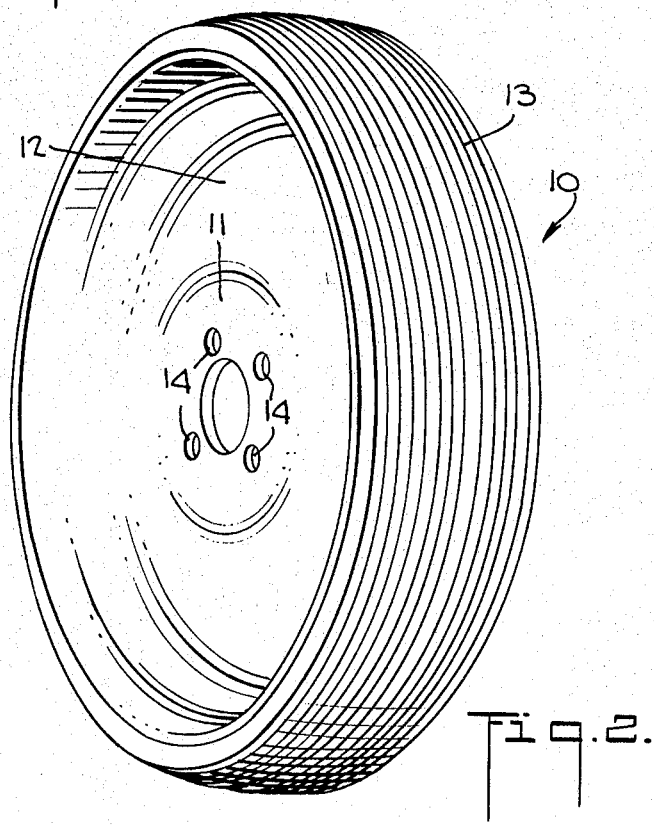
FIG. 2 is a rear isometric view of the wheel assembly of FIG. 1.

Referring now more particularly to the drawings wherein numerals designate identical parts throughout the several views, and more particularly to FIGS. 1 and 2 wherein the basic concept of the present invention is shown. In FIGS. 1 and 2, there is shown a wheel assembly designated by reference numeral 10, which is comprised of hub 11, a integrally formed rim portion 12 both, of which may be constructed of a visco-elastic multi-axially strength oriented plastic material. In a preferred embodiment, the hub 11 and the rim portion 12 are composed of an epoxy plastic reinforced with fiber glass. The rim portion 12 carries a ground engaging tread 13. Tread 13 is composed of an elastomeric material such as natural or synthetic rubber, compositions used in the construction of treads for conventional pneumatic tires, and other synthetic polymeric materials, such as polyurethane.

The tread 13 is preferably attached to the rim portion 12 using conventional in situ molding techniques, as for example, liquid injection molding. However, it should be appreciated that the method of construction is not critical to the performance characteristics of the wheel assembly of this invention, and conventional methods of molding plastics and elastomeric materials known to those of skill in the art can be used, in conformance with the knowledge of the art. For example, it is well known in the art that rubber does not have natural adhesion to certain plastic materials. Accordingly, if the rim portion 12 is constructed of such plastic materials, an adhesive must be employed when rubber is used to construct the tread member 13 to join the tread member 13 to the rim portion 12. Whereas, when a polyurethane is used to construct the tread member 13, it has natural adhesion to the rim portion 12 and no additional adhesive is necessary.

As shown in FIGS. 1 and 2, hub portion 11 is of conventional design for mounting on a conventional vehicular wheel mount. Hub 11 includes a plurality of holes through which extend the threaded members on the vehicular mount (not shown). The wheel assembly 10 is secured thereto by threaded members and nuts 14(a) as depicted in FIG. 1. While in the preferred embodiments, conventional wheel mounting means have been used, it should be readily apparent to those skilled in the art that the particular manner by which the wheel assembly of this invention is affixed to a vehicle is not critical to its performance characteristics.

Figure 3:
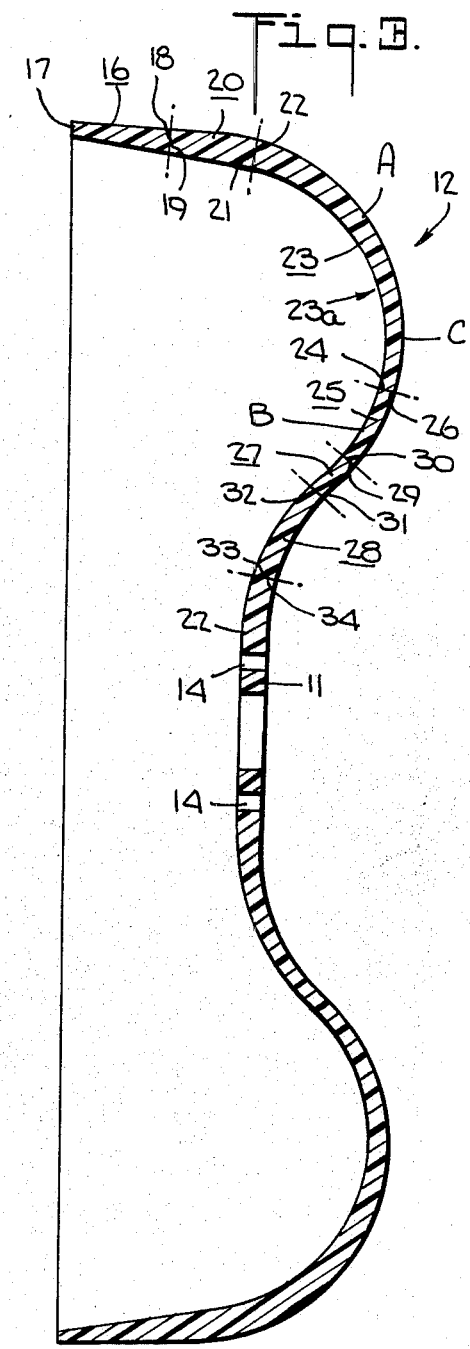
FIG. 3 is an enlarged diametric section of hub and rim portions of the wheel assembly of FIG. 1.
Figure 4:
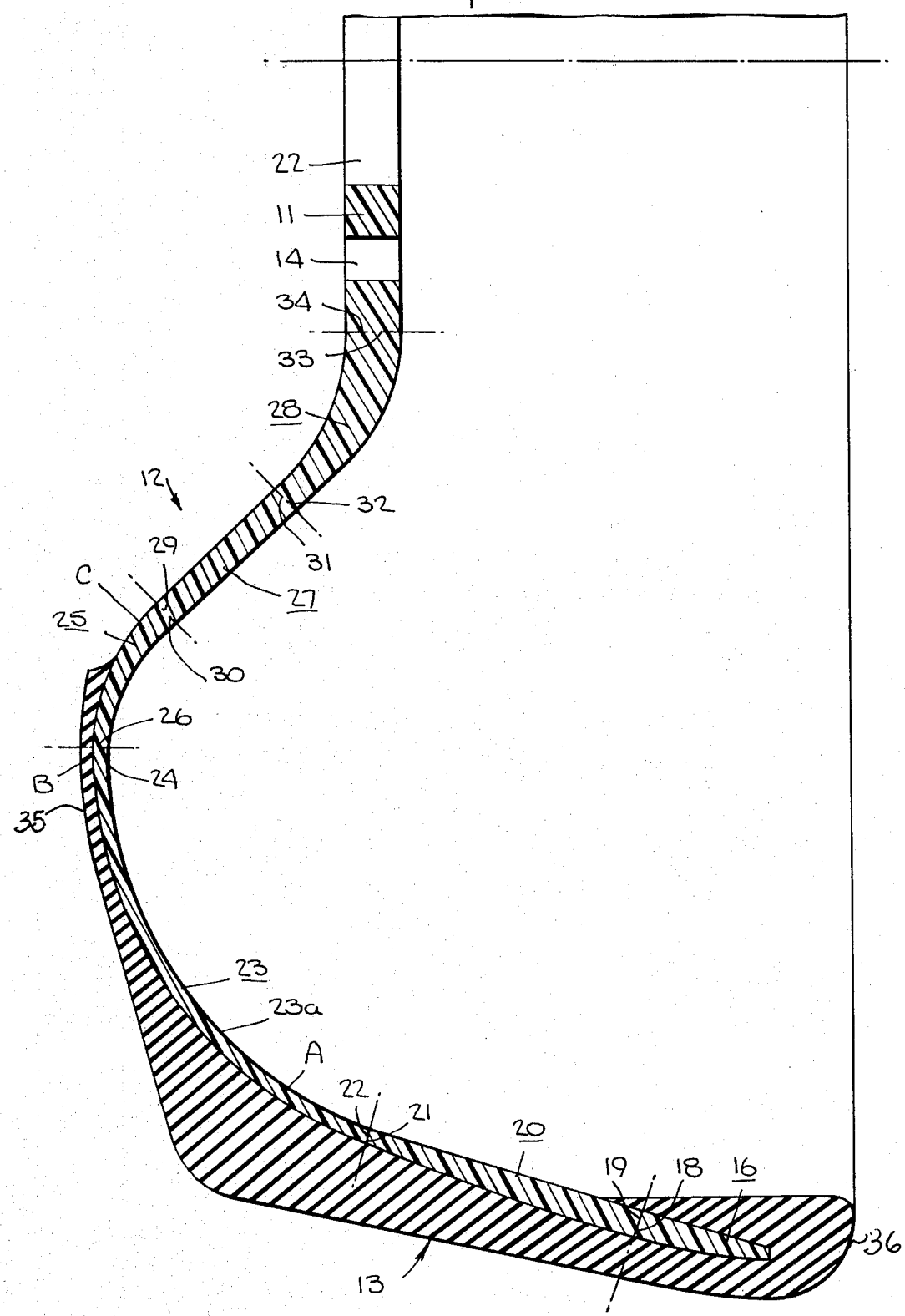
FIG. 4 is an enlarged partial diametric section of the hub and rim portions of the embodiments of FIGS. 1 to 3.
Figure 5:
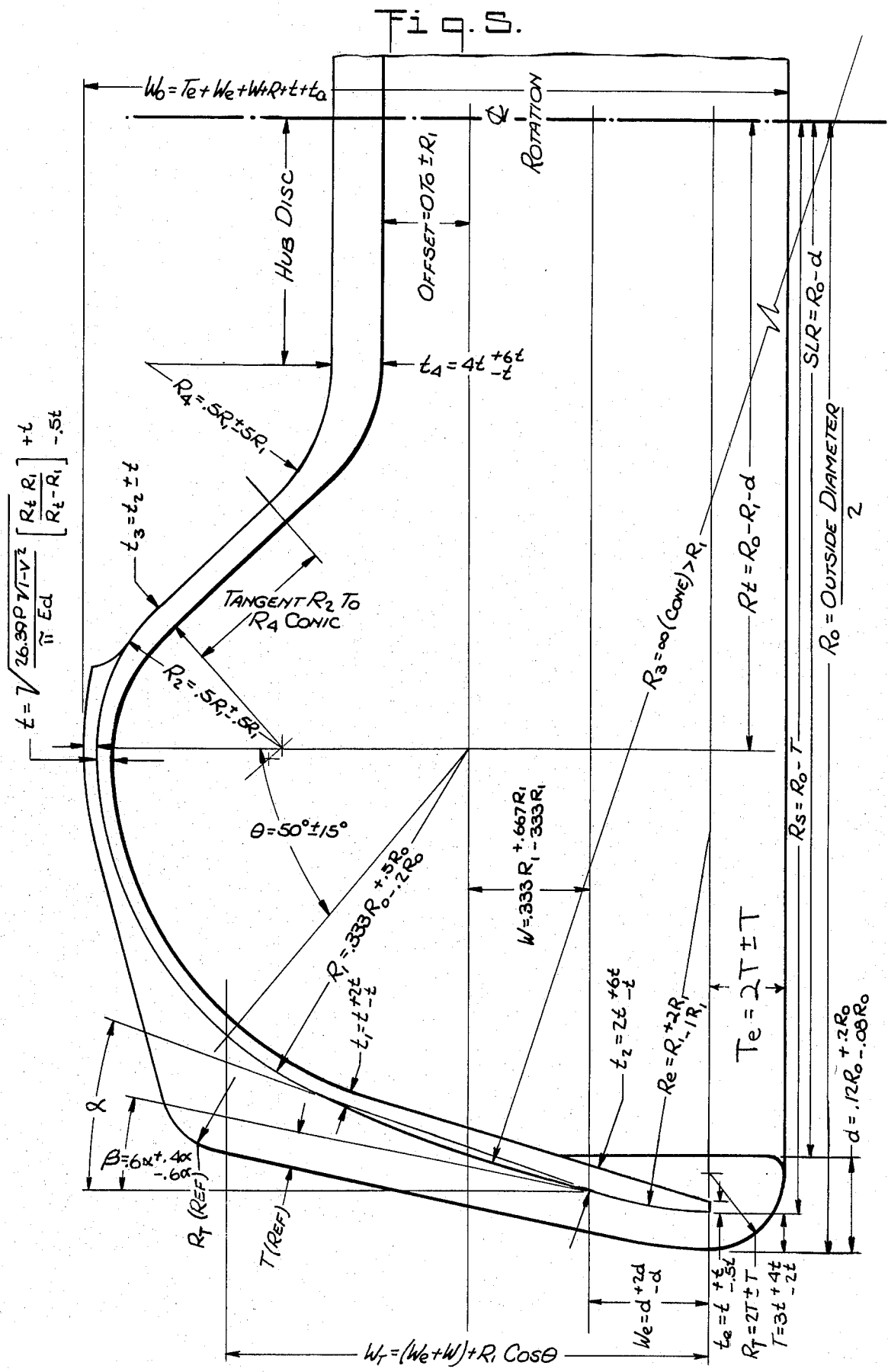
FIG. 5 is a schematic geometric diagram of the structure of FIG. 4 and illustrates the general construction of these embodiments.

As is readily apparent from FIGS. 3, 4 and 5, the rim portion 12 of the preferred embodiment of this invention has an S-shaped radial cross-sectional configuration. The rim portion 12, from its outside diameter inwardly to the radial mounting disc 15, includes an edge element 16 having a width $W_e$ and a thickness $t_e$ at the outside edge 17, and a thickness $t_2$ at the inside edge 18. The edge element 16 is attached continuously and tangentially at its inside edge 18 to the larger outside diameter edge 19 of a first frustum of a right circular cone 20. The edge 19 has a thickness $t_2$. The first frustum 20 in turn is attached continuously at the smaller diameter inside edge 21 of thickness $t_1$ to the outside edge 22 of a first toroidal segment 23. The first toroidal segment 23 has a radius of curvature $R_1$. The outside edge 22 has a thickness $t_1$, the intermediate structural portion 23(a) has a thickness t, and the inner edge of the first toroidal segment 24 has a thickness t. The first toroidal segment 23 is attached at its inner edge 24 continuously and tangentially to the outside edge 26 of a second toroidal segment 25. The second toroidal segment 25 has a radius of curvature $R_2$ an inside edge thickness of $t_3$ and an outside edge of thickness t.

The rim portion 12 further includes a second frustum of a right circular cone or ogive 27 and a third toroidal segment 28. The second frustum has an overall thickness of $t_3$, and has its larger diameter end 29 attached continuously and tangentially to the inside edge 30 of second toroidal segment 25, and has its smaller diameter edge 31, continuously and tangentially attached to the outside edge 32 of the third toroidal segment 28.

The third toroidal segment 28 has a radius of curvature $R_4$. The outside edge 32 of the third toroidal segment has a thickness $t_3$ and the inside edge 33 of the third toroidal segment which is attached continuously and tangentially to the larger diameter, outer edge 34 of a radial mounting disc 22. The latter is adapted for attachment at its inner hub portion 11 to an axle, has a thickness $t_4$. The third toroidal segment 28 has a tapered structural configuration in which $t_4$ is greater than $t_3$.

The edge element 16 of rim portion 12 is tapered as shown in FIGS. 3 to 5 to aid in controlling the shape of the tread footprint described below and in attaching tread member 13 thereto. In addition, as is readily apparent from FIGS. 3 to 5, the rim portion 12 may optionally be tapered at points A, B and C which are the respective junctions of first conical frustum 20 and the first toroidal segment 23 and the second toroidal segment 25 and the second conical segment frustum 27. These tapered junctions provide a relatively constant working stress of a relatively low order of magnitude throughout the structure and minimize stress concentrations under high deflection loads or impacts, and provide improved deflection characteristics.

As described hereinabove the hub 11 and rim portion 12 are preferably constructed of a visco-elastic multiaxially strength oriented plastic material. In the embodiment of FIGS. 1 to 5, the hub 11 and the rim portion 12 are fabricated of molded structurally oriented layers of fiberglass reinforced epoxide plastic having excellent long-term fatigue properties together with shock absorbing and damping characteristics associated with relatively slow deflection recovery rates. The fiberglass fibers are aligned perpendicular or parallel relative to the axis of rotation according to estimated structural strength requirements. One type of fiber reinforced plastic suitable for use with the present invention is described in U.S. Pat. No. 3,988,089 issued Oct. 26, 1976, and U.S. Pat. No. 4,130,154 issued Dec. 19, 1978, the disclosure thereof being incorporated herein by reference.

The wheel assembly depicted in FIGS. 1 to 5 has a design load P, an outside radius $R_o$, a structural width W, a static deflection d, a static load radius SLR, and a structural radius $R_t$. These parameters, together with the structural parameters of the rim portion i.e. $R_1$, t, $t_1$, $t_2$ $t_3$, $t_4$, $R_4$, $t_e$ and $W_e$ are selected such that the increase in deflection per increasing load for said structure is similar to the conventional pneumatic tire at loads up to about the design load P of the wheel assembly, and the increase in deflection per increasing load is less than that of a conventional pneumatic tire at loads above the design load of the wheel assembly of the preferred embodiments of FIGS. 1 to 5. These performance characteristics are achieved when the wheel assembly has the following structural design parameters:

d is from about 0.04 $R_o$ to about 0.32 $R_o$;
SLR is approximately equal to $R_o - d$;
$R_1$ is from about 0.133 $R_o$ to about 0.833 $R_o$;
$R_t$ is approximately equal to $R_o - R_1 - d$;
$W_e$ is not greater than about 3d;
$t_2$ is from about t to about 8t;
$t_e$ is from about 0.5t to about 2t;
$t_3$ is not greater than 9t;
$R_2$ and W individually are not greater than $R_1$;
t is from about $$\frac{1}{2}\sqrt{\frac{26.39P\sqrt{(1-\nu^2)}}{\pi E d}\left[\frac{R_t R_1}{R_t - R_1}\right]}$$

to about $$2\sqrt{\frac{26.39P\sqrt{(1-\nu^2)}}{\pi E d}\left[\frac{R_t R_1}{R_t - R_1}\right]}$$

wherein:
 ν is Poisson's ratio for the material used to construct the wheel structure and
 E is the standard ASTM tensile modulus of elasticity of the material used to construct the wheel structure.
 E and ν can be measured by any standard technique, e.g., ASTM D 3039-76 for oriented fiber composites.
 A particularly preferred embodiment of this invention having the aforementioned deflection characteristics has the following structural design parameters:
d is approximately equal to 0.12 $R_o$;
SLR is approximately equal to $R_o - d$;
$R_1$ is approximately equal to 0.333 $R_o$;
t is approximately equal to $$\sqrt{\frac{26.39P\sqrt{(1-\nu^2)}}{\pi E d}\left[\frac{R_t R_1}{R_t - R_1}\right]}$$

W is approximately equal to 0.333 $R_1$;
$t_2$ is approximately equal to 2t;
$t_e$ is approximately equal to t;
$t_3$ is approximately equal to 2t;
$R_2$ is approximately equal to 0.5 $R_1$; and
$W_e$ is approximately equal to d;

The wheel assembly of this invention does not require a tread in order to be operative within the concept of this invention. However, as shown in FIGS. 4 and 5, a tread is preferred, and its parameters are selected such that the composite of the tread 13 and rim portion 11 possesses the aforementioned deflection characteristics. These characteristics are achieved when the thickness of the tread varies from about t to about 7t, where t is the structural thickness of the intermediate portion of the first toroidal segment 23. The width of the tread $W_t$ 13 is approximately equal to $W_e + W + R_1 \cos \phi$ where $W_e$ is the width of the edge element 16 of the structure and is not greater than 3d, W is not greater than $R_1$, and $\phi$ is from about 35° to about 65°.

While the primary purpose of the tread is to provide a substantially flat footprint area for increased traction, the tread can also provide protection for various parts of the wheel structure. For example, a portion of the tread can be attached to the outer surface of one or more of the toroidal segments of the structure as shown in FIGS. 4 and 5 forming extension 35 of the tread 13. Extension 35 protects the side walls of wheel structure 15 from abrasion and impact by curbs, stones, and other like abrasive objects which could contact the outer surface of the structure during use. Similarly, a portion of the tread 13 can encase a portion of the edge element 16, likewise protecting the element from abrasion from the abrasive pavement, and like abrasive surfaces that may contact the wheel structure while it is being used. This feature is shown in FIGS. 4 and 5 by tread encasing element 36.

Figure 6:
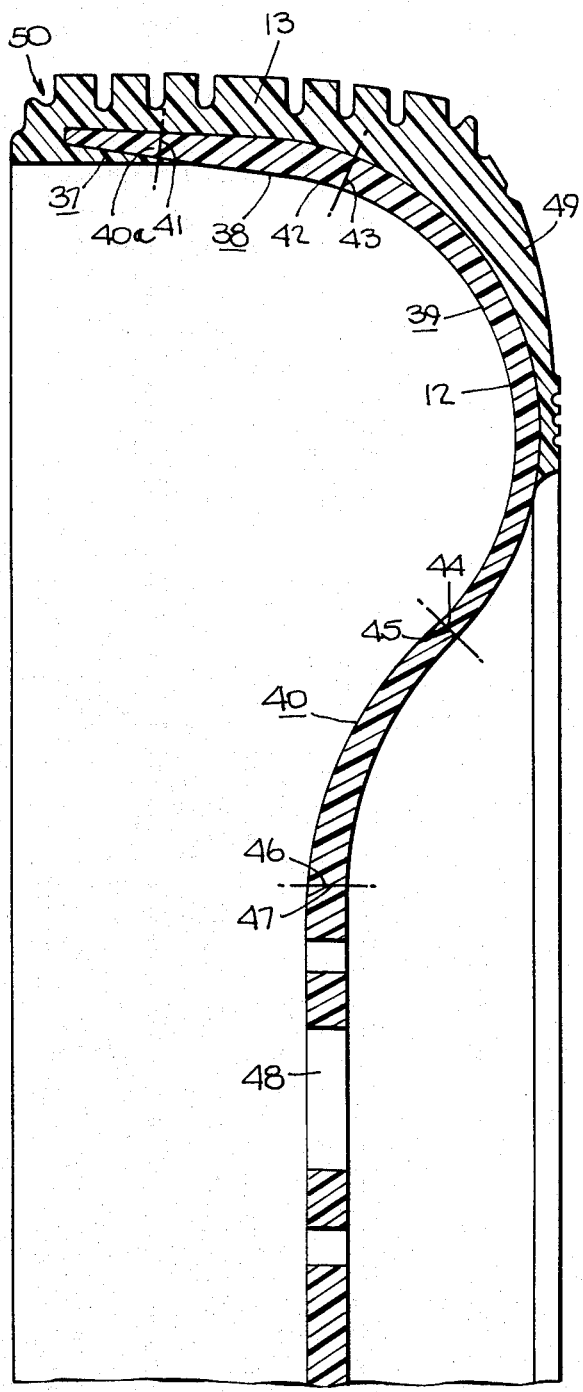
FIG. 6 is a partial diametric section of the hub and rim portions of an embodiment of this invention.
Figure 7:
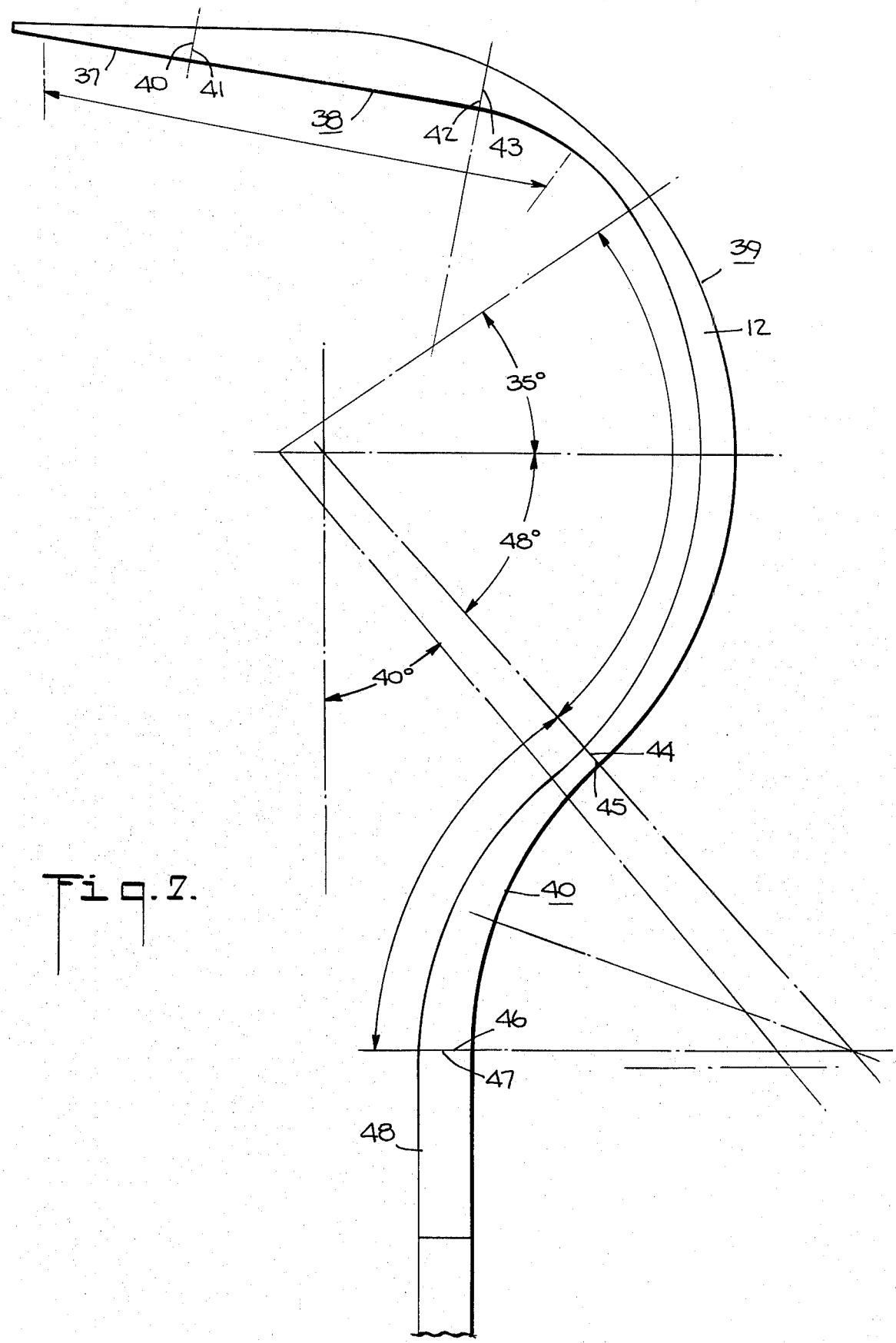
FIG. 7 is an enlarged schematic geometric diagram showing the general construction of the embodiment of FIG. 6.

FIGS. 6 and 7 illustrate another embodiment of this invention. The rim portion 12 of the embodiment of FIG. 6 consists of an edge element 37; a first conical frustum 38; a first toroidal segment 39 and a second toroidal segment 40. In this embodiment, the inner edge 40a of the edge element 37 is continuously and tangentially attached to the larger outside diameter edge 41 of the first conical frustum 38. The inside smaller diameter edge 42 of the first frustum 38 is continuously and tangentially attached to the outside edge 43 of a first toroidal segment 39, whose inside edge 44 is attached continuously and tangentially attached to the outside edge 45 of the second toroidal segment 40. Lastly, the inside edge 46 of the second toroidal segment 40 is continuously and tangentially attached to the outer curved edge 47 of a central mounting disc 48. The tread 13, having an extension 49 and an encasing element 50 is bonded to the outside surface of the edge element 37, the first conical frustum 38 and a portion of the first toroidal segment 39 to provide greater traction and protection for the structural elements of the rim portion 12. The structural parameters, i.e. P, $R_o$, d, SLR, $R_t$, $R_1$, t, $t_1$, $t_2$, $R_2$, $t_3$, W, $R_4$, $t_4$, T, $T_w$, $T_e$, and $R_t$ are selected such that the increase in deflection per increasing load for the embodiment is similar to that of a conventional pneumatic tire at loads below the design load P of the embodiment, and the increase in deflection per increasing load is less than that of a conventional pneumatic tire at loads above the design load of the embodiment.

Figure 8:
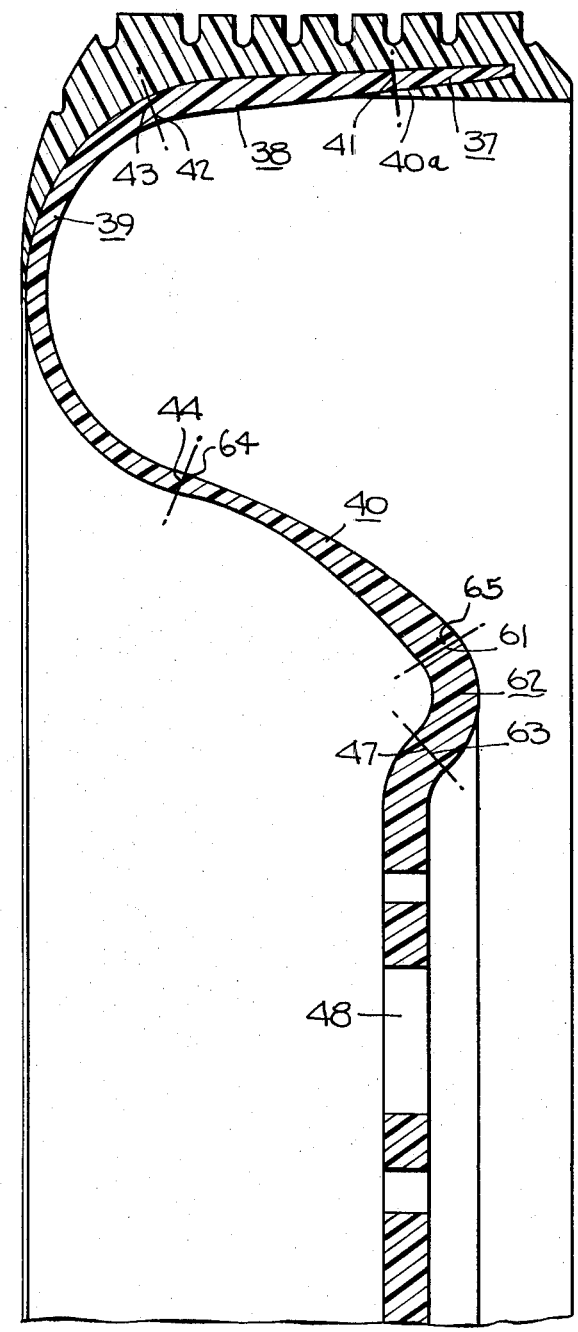
FIG. 8 is a partial diametric section of another embodiment of the present invention.

FIG. 8 illustrates still another embodiment of this invention. The rim portion 12 of the embodiment of FIG. 8 consists of an edge element 37; a first conical frustum 38; a first toroidal segment; a second toroidal segment 40 and a third toroidal segment 62.

The embodiment shown in FIG. 8 consist of an edge element 37, the inside edge 40 of which is continuously and tangentially attached to the outside larger diameter edge 41 of the frustum of a right circular cone 38. The inside smaller diameter edge 42 of the conical frustum 38 is attached continuously and tangentially to the outside edge 43 of a substantially half torus 39 whose inside edge 44 is continuously attached tangentially at a relatively small angle, e.g. 10°, to the outside edge 64 of a second toridal or conical segment 40 which is continuously attached tangentially at its inside edge 65 to the outer edge 61 of a third smaller toroidal segment 62 whose inside edge 63 is continuously attached tangentially to the outer curved edge 47 of a central mounting disc 48. The structural parameters of all of the aforesaid geometrical elements are adjusted by mathematical estimate and empirical testing to provide a relatively constant working stress of a low order of magnitude throughout the structure and to minimize stress concentrations under high deflection loads or impacts, and to achieve the deflection characteristic described above.

The non-pneumatic wheel assembly and tire tread of the present invention functions to provide a composite flexible wheel structure having uniform cushioned load distribution. The extensions of the tread prevent curb abrasions in the major structural torus section and the edge element. The assembly provides traction and cornering deflection forces similar to that of a conventional pneumatic tire. Obvious advantages include having the performance of a pneumatic tire wheel without the disadvantages associated with it going flat. The need for a spare tire on the vehicle is eliminated. The unsprung weight of the vehicle is reduced as is overall vehicle weight. Increased brake diameter and area is possible, and there is increased clearance space for the suspension mechanism of the vechicle.

The wheel structure of this invention can be manufactured employing those procedures known to those skilled in the art of manufacturing molded articles composed of reinforced plastics. Such procedures are well known and will not be described in detail herein.

Figure 9:
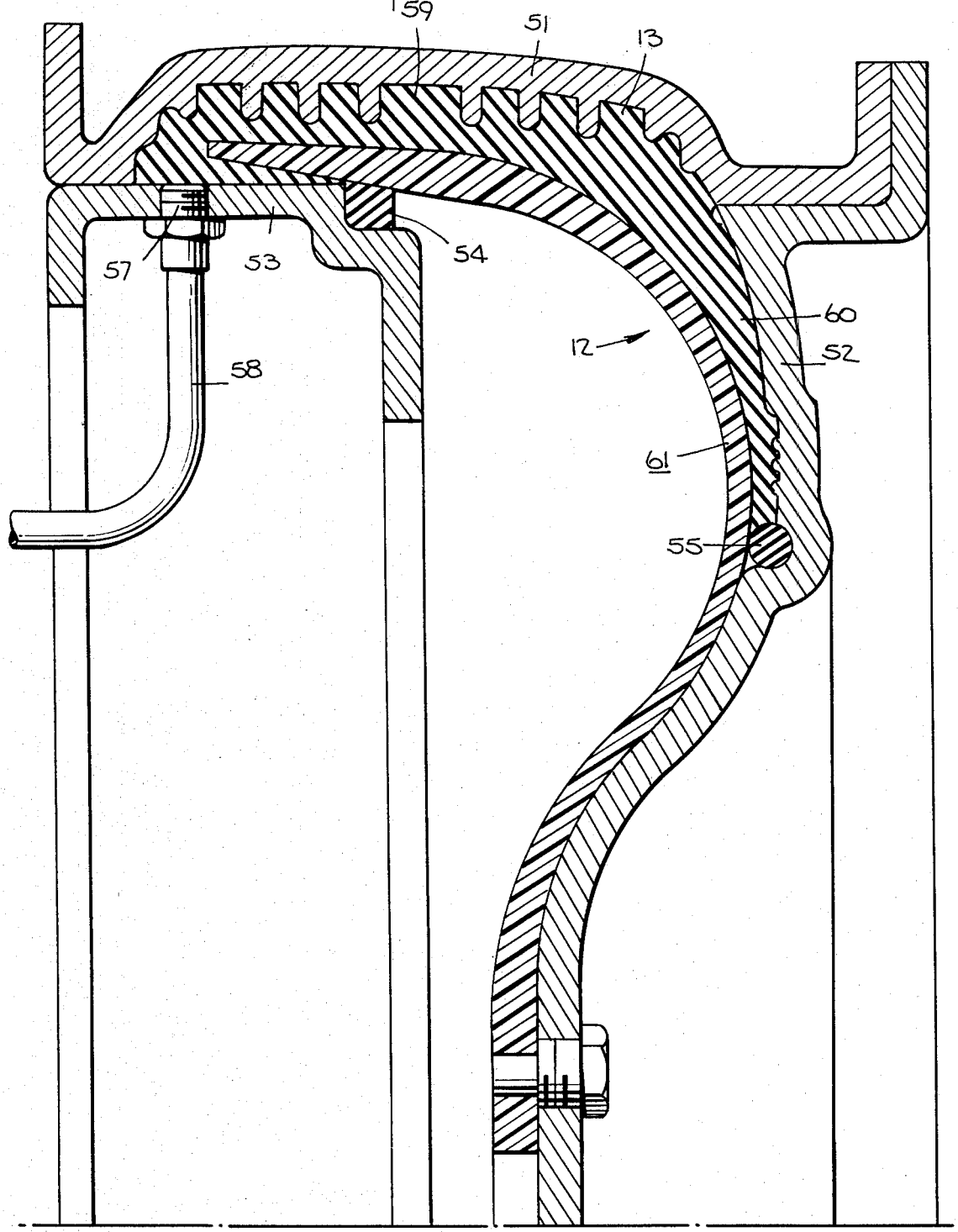
FIG. 9 is an enlarged partial section of the embodiment of FIGS. 6 and 7 shown in the mold.

Likewise, the tread member 13 can be molded to rim portion 12 employing known techniques. One preferred method of molding tread member 13 to rim portion 12 is shown in FIG. 9. The metallic mold is comprised of a top member 51, side member 52 and bottom member 53. The rim member itself constitutes part of the mold bottom together with seal pocket 54 and O-ring 55. The mold cavity 56 defined by the above-identified structural features is filled by injection of the elastomeric material through injection port 57 to which is connected liquid supply tube 58.

As can be seen, the tread 13 is provided with a rib configuration simulating a standard tire and is crowned on the outside half similar to that of a standard tire and is tapered on the inside half to allow for structural deflection curvature to balance the primary contact area in the center rib 59 of the tread. This is done to achieve low rolling resistance as well as to control the load distribution into the structure while at the same time offering an increased lateral skid resisting area under cornering moments from either direction. The wider center rib 59 is employed to aid in uniform tread wear.

As is apparent from FIG. 9, the tread shoulder 60 is carried over to the center of the side of the toroidal segment 61 as shown to provide increased composite section modulus of the reinforced plastic/tread rubber combination and to protect the structure from curb abrasion and impacts. This also gives a more conventional tire wheel appearance to the unit. The increased composite section modulus of this configuration increases the structural stiffness thereby reducing static deflection significantly relative to that of the reinforced plastic structure alone.

The curves plotted in FIGS. 10 and 11 reflect load/deflection data obtained during actual tests on wheel structures fabricated in accordance with the principles of the present invention. In FIG. 10, curves A and B show data on wheel structures tested with bonded rubber tread and polyurethane tread, respectively, whereas curves C through G show data on wheel structures tested without tread. Curves A and C provide a comparison of the same wheel with and without tread. Curves D and E compare two wheels with no tread. The two wheels of Curves D and E were supplied with treads and tested. The results were so similar for each that the results are represented by a single curve, Curve B. Curves F and G were for two different wheels having substantially less fiber reinforcement due to the use of fiber with a reduced thickness. The two different wheels of curves F and G possessed longer conical elements and had no tread.

As is readily apparent from FIG. 10, there is a linear relationship between the deflection of the structure and the load causing the deflection, up to a certain load. This relationship is graphically illustrated by the portion of curve G identified in FIG. 10 by $a_1$. The $a_1$ portion of curve G is a straight line having a slope P. At a load of approximately 175 pounds, identified in FIG. 10 as $a_2$, the slope of the curve begins to increase which indicates that the increase in deflection per increasing load is decreasing. This increase in slope continues to a load of approximately 200 pounds identified in FIG. 10 as $a_3$, at which time curve C becomes a straight line having a slope $P_2$, where $P_2$ is greater than $P_1$. This indicates that at loads greater than $a_3$, the relationship between load and deflection is again linear.

The load at which the slope of the deflection curve begins to change and the rate of change in deflection per increasing load is dependent on the structural parameters of the wheel structure, and the tread. The data in FIG. 10 for the structures of curves A and C, and for the structures of curves B, D and E, graphically depicts the coaction of the bonded tread with the specific geometrical elements of the reinforced wheel structure in attenuating the deflection of the structure under load. A comparison of the deflection of those structures having tread with the deflection of those structures without tread readily reveals that those structures having a tread exhibit the preferred high initial deflection. FIG. 10 also indicates that the structures of curves F and G which do not have a tread exhibit a higher initial deflection as compared to structures C, D and E which also did not have tread.

The preferred high initial deflection exhibited by the structures of curves F and G of FIG. 10 was due primarily to increasing the conic angle and length of the conic or ogival element. After the conic or ogival element flattens along the contact surface the loading progresses into the first toroidal segment where both elements begin to deflect as a unit, the amount of additional deflection per load increment is less than that of the conic element alone.

This dual modulus character in the structures of curves F and G was also exhibited by the preferred embodiment of FIGS. 1 to 5, whose deflection characteristics with and without a tread are compared to those of a standard DR 78-14 pneumatic tire inflated at 24 psi, and a high pressure spare tire in FIG. 11. Curve H shows the data for the preferred wheel structure of FIGS. 1 to 5 with a bonded rubber tread, whereas curve I show data on the same wheel structure without tread. Curve J shows data on a conventional pneumatic tire having the same design load as the structures of curves H and I. Curve K shows data for a standard high pressure spare tire.

As is apparent from FIG. 11, the relationship between the load and deflection for a conventional pneumatic tire and high pressure spare was basically linear throughout the range of loads tested. Further, the deflection characteristics of the conventional pneumatic tire of curve J is superior to that of the high pressure spare tire of curve K, because of increased deflection at and about the design load. It is also readily apparent the deflection characteristics of the structures of curves H and I are superior to those of the conventional pneumatic tire of curve J. For example, at loads just below the design load, the change in deflection per increasing load for the structure of curve H is roughly comparable to that of the conventional pneumatic tire of curve J. As a result, the structure of curve H absorbs shock, and provides a soft smooth ride in the manner of a conventional pneumatic tire. However, at about the design load, the deflection characteristic of the structure of curve H begins to differ from that of the conventional pneumatic tire of curve J. At about the design load, the change in deflection per increasing load begins to decrease, becoming approximately constant at a load just above the design load. At this point the relationship between load and deflection becomes essentially linear. The obvious advantage from the decrease in the deflection per increasing load, is that the structure of curve H is stronger than a conventional pneumatic tire at loads above design loads, which decreases the probability of wheel failure and increases the weight capacity of the structure.

The wheel assembly of the present invention provides an operational wheel for a wide range of on and off the road vehicles such as military, aircraft and commercial vehicles, as well as passenger cars.

While certain representative embodiments and details have been shown for the purpose of illustrating the invention, it will be apparent to those skilled in the art that various changes and modifications may be made therein without departing from the scope and spirit of the invention.

What is claimed is:

1. A wheel structure having a design load P; an outside radius $R_0$; a structural width W; a static deflection d; a static load radius SLR; and a structural radius $R_t$; said structure constituted by:
    a first frustum of a right circular cone the larger diameter outside edge of which has a thickness $t_2$, and the smaller diameter inside edge of which has a thickness $t_1$;
    a first toroidal segment having a radius of curvature $R_1$, and an intermediate portion of thickness t, said first toroidal segment also having an outer edge of thickness $t_1$ which is attached continuously and tangentially to the smaller diameter inside edge of said first frustum, and having an inner edge of thickness $t_3$; and
    a radial mounting disc adapted for attachment at its inner portion to an axle having a larger diameter outer edge which is attached continuously and tangentially to the inner edge of said first toroidal segment;
    wherein $R_1$, W, P, $R_0$, d, SLR, $R_t$, t, $t_1$, $t_2$ and $t_3$ are selected such that the ratio of load to deflection above the design load is greater than the ratio of load to deflection below the design load.

2. The wheel structure of claim 1, wherein the wheel structure is a composite wheel structure constructed of a visco-elastic, multi-axially strength oriented plastic material.

3. A wheel structure according to claim 2 which includes a second toroidal segment and a third toroidal segment which cooperate to interconnect said outer edge diameter of said disc and said inner edge of said first toroidal segment;

said second toroidal segment having a radius of curvature $R_2$ having an outer edge of thickness t attached continuously and tangentially to the inner edge of said first toroidal segment, and having an inner edge of thickness $t_3$ attached continuously and tangentially to the outer edge of said third toroidal segment;

said third toroidal segment having a radius of curvature $R_4$, and having an outside edge thickness $t_3$, and an inside edge of thickness $t_4$, said outside edge being attached continuously and tangentially to the smaller diameter edge of said second toroidal segment, and said inside edge being attached continuously and tangentially to the larger diameter outer edge of said disc;

wherein P, $R_0$, d, SLR, $R_t$, $R_1$, t, $t_1$, $t_2$, $R_2$, $t_3$, W, $R_4$ and $t_4$ are selected such that the ratio of load to deflection above the design load is greater than the ratio of load to deflection below the design load.

4. A wheel structure according to claim 3, wherein said third toroidal segment has a tapered structural configuration in which $t_4$ is greater than $t_3$.

5. A wheel structure according to claim 3, which includes a second frustum of a right circular cone interconnecting said second and third toroidal segments;

said second frustum having a thickness $t_3$, and having its larger diameter edge continuously and tangentially connected to the inner edge of said second toroidal segment and having its smaller diameter edge continuously and tangentially attached to the outer edge of said third toroidal segment;

wherein P, $R_0$, d, SLR, $R_t$, $R_1$, t, $t_1$, $t_2$, $t_3$, $t_4$, $R_2$ and $R_4$ are selected such that the ratio of load to deflection above the design load is greater than the ratio of load to deflection below the design load.

6. A wheel structure according to claim 4 having a design load P and an outside radius R, wherein:

d is from about 0.04 $R_0$ to about 0.32 $R_0$;
SLR is approximately equal to $R_0-d$;
$R_1$ is from about 0.133 $R_0$ to about 0.833 $R_0$;
$R_t$ is approximately equal to $R_0- R_1-d$;
$W_e$ is not greater than about 3d;
$t_2$ is from about t to about 8t;
$t_e$ is from about 0.5t to about $t_2$;
$t_3$ is not greater than 9t;
$R_2$ and W individually are not greater than $R_1$;
t is from about $$\frac{1}{2}\sqrt{\frac{26.39P\sqrt{(1-\nu^2)}}{\pi Ed}\left[\frac{R_tR_1}{R_t-R_1}\right]}$$

to about $$2\sqrt{\frac{26.39P\sqrt{(1-\nu^2)}}{\pi Ed}\left[\frac{R_tR_1}{R_t-R_1}\right]}$$

wherein:

$\nu$ is Poisson's ratio for said fiber reinforced plastic composite;
E is the modulus of elasticity for said fiber reinforced plastic composite;
wherein the ratio of load to deflection above the design load is greater than the ratio of load to deflection below the design load.

7. A wheel structure according to claim 6 having a design load P and an outside radius $R_0$ wherein:

d is approximately equal to 0.12 $R_0$;
SLR is approximately equal to $R_0-d$;
$R_1$ is approximately equal to 0.333 $R_0$;
t is approximately equal to $$\sqrt{\frac{26.39P(1-\nu^2)}{\pi Ed}\left[\frac{R_tR_1}{R_t-R_1}\right]};$$

W is approximately equal to 0.33 $R_1$;
$t_2$ is approximately equal to 2t;
$t_e$ is approximately equal to t;
$t_3$ is approximately equal to 2t;
$R_2$ is approximately equal to 0.5 $R_1$; and
$W_e$ is approximately equal to d;
wherein the ratio of load to deflection above the design load is greater than the ratio of load to deflection below the design load.

8. A wheel structure according to claims 1 or 2, which includes a second frustum of a right circular cone or ogive and a second toroidal segment which cooperate to interconnect said outer edge diameter of said disc, and said inner edge of said first toroidal segment, said second frustum having a thickness $t_3$, and having its larger diameter edge continuously and tangentially connected to the inner edge of said first toroidal segment and having its smaller diameter edge continuously and tangentially attached to the outer edge of said second toroidal segment;

said second toriodal segment having a radius of curvature $R_4$, and having an outside edge of thickness $t_3$ and an inside edge of thickness $t_4$, said outside edge being attached continuously and tangentially to the smaller diameter edge of said second frustum, and said inside edge being attached continuously and tangentially to the larger diameter outer edge of said disc;

wherein P, $R_0$, d, SLR, $R_t$, $R_1$, t, $t_1$, $t_2$, $t_3$, $t_4$, and $R_4$ are selected such that the ratio of load to deflection above the design load is greater than the ratio of load to deflection below the design load.

9. A vehicle having mounted on an axle thereof, a wheel structure according to claim 1 or 2.

10. A wheel structure according to claim 1 wherein $t_2$ is greater than $t_1$.

11. A wheel structure according to claim 1, which includes an edge element attached continuously and tangentially at one edge to the larger diameter of said first frustum;

said edge element having a width $W_e$, and having a thickness $t_2$ at said edge of said edge element which is attached to said first frustum, and having a thickness $t_e$ at the edge of said edge element opposite to said edge of attachment to said first frustum;

wherein P, $R_0$, d, SLR, $R_t$, $R_1$, t, $t_1$, $t_3$, $t_4$, $R_2$, $R_4$, $t_2$, $t_e$ and $W_e$ are selected such that the ratio of load to deflection above the design load is greater than the ratio of load to deflection below the design load.

12. A wheel structure according to claim 2, which includes an edge element attached continuously and tangentially at one edge to the larger diameter of said first frustum;

said edge element having a width $W_e$, and having a thickness $t_2$ at said edge of said edge element which is attached to said first frustum, and having a thickness $t_e$ at the edge of said edge element opposite to said edge of attachment to said first frustum;

wherein P, $R_0$, d, SLR, $R_t$, $R_1$, t, $t_1$, $t_3$, $t_4$, $R_2$, $R_4$, $t_2$, $t_e$ and $W_e$ are selected such that the ratio of load to deflection above the design load is greater than the ratio of load to deflection below the design load.

13. A wheel structure according to claim 3, which includes an edge element attached continuously and tangentially at one edge to the larger diameter of said first frustum;

said edge element having a width $W_e$, and having a thickness $t_2$ at said edge of said edge element which is attached to said first frustum, and having a thickness $t_e$ at the edge of said edge element opposite to said edge of attachment to said first frustum;

wherein P, $R_0$, d, SLR, $R_t$, $R_1$, t, $t_1$, $t_3$, $t_4$, $R_2$, $R_4$, $t_2$, $t_e$ and $W_e$ are selected such that the ratio of load to deflection above the design load is greater than the ratio of load to deflection below the design load.

14. A wheel structure according to claim 5, which includes an edge element attached continuously and tangentially at one edge to the larger diameter of said first frustum;

said edge element having a width $W_e$, and having a thickness $t_2$ at said edge of said edge element which is attached to said first frustum, and having a thickness $t_e$ at the edge of said edge element opposite to said edge of attachment to said first frustum;

wherein P, $R_0$, d, SLR, $R_t$, $R_1$, t, $t_1$, $t_3$, $t_4$, $R_2$, $R_4$, $t_2$, $t_e$ and $W_e$ are selected such that the ratio of load to deflection above the design load is greater than the ratio of load to deflection below the design load.

15. A wheel structure according to claim 3 wherein the edge radius $R_4$ of said hub disc is not greater than $R_1$, and wherein the thickness of said hub disc is from about 3t to about 10t.

16. A wheel structure according to claim 5 wherein the edge radius $R_4$ of said hub disc is not greater than $R_1$, and wherein the thickness of said hub disc is from about 3t to about 10t.

17. A wheel structure according to claim 1 having a ground engaging tire tread of an elastomeric material bonded to said conical frustum and said edge element, and said first toroidal element such that under load deflection said tread or a portion thereof provides a substantially flat footprint area whereby increased traction is provided.

18. A wheel structure according to claim 2 having a ground engaging tire tread of an elastomeric material bonded to said conical frustum and said edge element, and said first toroidal element such that under load deflection said tread or a portion thereof provides a substantially flat footprint area whereby increased traction is provided.

19. A wheel structure according to claim 3 having a ground engaging tire tread of an elastomeric material bonded to said conical frustum and said edge element, and said first toroidal element such that under load deflection said tread or a portion thereof provides a substantially flat footprint area whereby increased traction is provided.

20. A wheel structure according to claim 5 having a ground engaging tire tread of an elastomeric material bonded to said conical frustum and said edge element, and said first toroidal element such that under load deflection said tread or a portion thereof provides a substantially flat footprint area whereby increased traction is provided.

21. A wheel structure according to claim 18, wherein a portion of said tread is bonded to said first toroidal segment, or a portion thereof thereby protecting said first toroidal segment from abrasion.

22. A wheel structure according to claim 19, wherein a portion of said tread is bonded to said first toroidal segment, or a portion thereof thereby protecting said first toroidal segment from abrasion.

23. A wheel structure according to claim 20, wherein a portion of said tread is bonded to said first toroidal segment, or a portion thereof thereby protecting said first toroidal segment from abrasion.

24. A wheel structure according to claim 1 wherein the ratios of load to deflection above the design load and below the design load remain essentially constant.

25. A molded resilient fiber reinforced plastic automotive wheel structure comprised of an open rim constituted by a first frustum of a right circular cone, a first toroidal segment having an outer edge attached continuously and tangentially to the smaller diameter edge of said first frustum, a radial mounting disc adapted for attachment at its inner portion to an axle, a second toroidal segment having a smaller diameter inner edge attached continuously and tangentially to the larger diameter outer edge of said disc, a second conical frustum interconnecting said first and second toroidal segments, said wheel structure having an S-shaped cross-sectional configuration and the ratio of load to deflection above the design load is greater than the ratio of load to deflection below the design load.

26. In the apparatus of claim 25, said first conical frustum having an axially extending outer tip portion tapered toward its outer end, and a ground-engaging tire tread of synthetic elastomeric material bonded to said tip portion, said tapered tip portion and tread assembly having, under load deflection, a substantially flat footprint area of the tread whereby increased traction is provided.

27. The wheel structure of claim 26 including reduced cross-sectional thickness in the vicinity of the junction of said first frustum to said first toroidal segment and in the vicinity of the junction of said second frustum to said first toroidal segment.

28. In the apparatus of claim 27, said tire tread being in situ molded on said tip portion.

29. In the apparatus of claim 28, said wheel structure having a curb side open configuration.

30. A vehicle having mounted on an axle thereof, a wheel structure according to claim 25.

31. A wheel structure having a design load P; an outside radius $R_0$; a structural width W; a static deflection d; a static load radius SLR; and a structural radius $R_t$; said structure constituted by:

a first frustum of an ogive, the larger diameter outside edge of which has a thickness $t_2$, and the smaller diameter inside edge of which has a thickness $t_1$;

a first toroidal segment having a radius of curvature $R_1$, and an intermediate portion of thickness t, said first toroidal segment also having an outer edge of thickness $t_1$ which is attached continuously and tangentially to the smaller diameter inside edge of said first frustum and having an inner edge of thickness $t_3$; and a radial mounting disc adapted for attachment at its inner portion to an axle having a larger diameter outer edge which is attached continuously and tangentially to the inner edge of said first toroidal segment;

wherein P, $R_0$, d, SLR, $R_t$, t, $t_1$, $t_2$ and $t_3$ are selected such that the ratio of load to deflection above the design load is greater than the ratio of load to deflection below the design load.

32. A wheel structure according to claim 31, which includes a second frustum of an ogive interconnecting said second and third toroidal segments;

said second frustum having a thickness $t_3$, and having its larger diameter edge continuously and tangentially connected to the inner edge of said toroidal segment and having its smaller diameter edge continuously and tangentially attached to the outer edge of said third toroidal segment;

wherein P, $R_0$, d, SLR, $R_t$, $R_1$, t, $t_1$, $t_2$, $t_3$, $t_4$, $R_2$ and $R_4$ are selected such that the ratio of load to deflection above the design load is greater than the ratio of load to deflection below the design load.

33. A wheel structure according to claim 31 which includes a second toroidal segment and a third toroidal segment which cooperate to interconnect said outer edge diameter of said disc and said inner edge of said first toroidal segment;

said second toroidal segment having a radius of curvature $R_2$ having an outer edge of thickness t attached continuously and tangentially to the inner edge of said first toroidal segment, and having an inner edge of thickness $t_3$ attached continuously and tangentially to the outer edge of said third toroidal segment;

said third toroidal segment having a radius of curvature $R_4$, and having an outside edge thickness $t_3$, and an inside edge of thickness $t_4$, said outside edge being attached continuously and tangentially to the smaller diameter edge of said second toroidal segment, and said inside edge being attached continuously and tangentially to the larger diameter outer edge of said disc;

wherein P, $R_0$, d, SLR, $R_t$, $R_1$, t, $t_1$, $t_2$, $R_2$, $t_3$, W, $R_4$ and $t_4$ are selected such that the ratio of load to deflection above the design load is greater than the ratio of load to deflection below the design load.

34. A wheel structure according to claim 31, which includes an edge element attached continuously and tangentially at one edge to the larger diameter of said first frustum;

said edge element having a width $W_e$, and having a thickness $t_2$ at said edge of said edge element which is attached to said first frustum, and having a thickness $t_e$ at the edge of said edge element opposite to said edge of attachment to said first frustum;

wherein P, $R_0$, d, SLR, $R_t$, $R_1$, t, $t_1$, $t_3$, $t_4$, $R_2$, $R_4$, $t_2$, $t_e$ and $W_e$ are selected such that the ratio of load to deflection above the design load is greater than the ratio of load to deflection below the design load.

35. A wheel structure according to claim 31, which includes a second frustum of a right circular cone interconnecting said second and third toroidal segments;

said second frustum having a thickness $t_3$, and having its larger diameter edge continuously and tangentially connected to the inner edge of said second toroidal segment and having its smaller diameter edge continuously and tangentially attached to the outer edge of said third toroidal segment;

wherein P, $R_0$, d, SLR, $R_t$, $R_1$, t, $t_1$, $t_2$, $t_3$, $t_4$, $R_2$ and $R_4$ are selected such that the ratio of load to deflection above the design load is greater than the ratio of load to deflection below the design load.

36. A wheel structure according to claim 31 wherein the edge radius $R_4$ of said hub disc is not greater than $R_1$, and wherein the thickness of said hub disc is from about 3t to about 10t.

37. A wheel structure according to claim 36, wherein said tire tread is composed of natural rubber, a synthetic elastomeric material or a combination thereof.

38. A wheel structure according to claim 36, wherein said tire tread is composed of conventional tread composition.

39. A wheel structure according to claim 36, wherein:
the thickness T of said tread is from about t to about 7t, where t is the intermediate thickness of the first toroidal segment;
the width $T_w$ of said tread is approximately equal to $W_e + W + R_1 \cos \phi$, wherein:
$W_e$ is the width of the edge element of said structure and is not greater than 3d;
W is not greater than $R_1$; and $\phi$ is from about 35° to about 65°.

40. A wheel structure according to claim 39 wherein theta is from 45° to 65°.

41. A wheel structure according to claim 36, wherein a portion of said tread encases the outside edge of said edge element, thereby protecting said element from abrasion.

42. A wheel structure according to claim 41, wherein:
the width of the encasing portion of said tread $T_e$ is in range of from about T to about 3T;
wherein T is the thickness of said tread.

43. A wheel structure according to claim 38, wherein the angle of tread surface $\beta$ is not greater than $\alpha$ where $\alpha$ is the angle formed by the tangent line between $R_1$ and $R_e$ with a line parallel to the centerline of rotation of said wheel structure.

44. A wheel structure according to claim 43 wherein beta is from 0.2 alpha to alpha.

45. A wheel structure according to claim 36, including reduced cross-sectional thickness in the vicinity of the junction of said first frustum to said first toroidal segment and in the vicinity of the junction of said second frustum to said second toroidal segment.

46. A wheel structure according to claim 36 including reduced cross-sectional thickness in the vicinity of the junction of said second frustum to said third toroidal segment.

47. A wheel structure according to claim 36, apart from said tread, being composed of high strength fiberglass reinforced plastic composite, wherein the ratio of load to deflection above the design load is greater than the ratio of load to deflection below the design load.

48. A wheel structure according to claim 45, wherein said tire tread is in situ molded on said first conical frustum and said edge element and said first toroidal segment.

49. A wheel structure according to claim 45, wherein said wheel structure has a curb side open configuration.

50. A wheel structure according to claim 31 having a ground engaging tire tread of an elastomeric material bonded to said conical frustum and said edge element, and said first toroidal element such that under load deflection said tread or a portion thereof provides a substantially flat footprint area whereby increased traction is provided.

51. A wheel structure according to claim 35, wherein a portion of said tread is bonded to said first toroidal segment, or a portion thereof thereby protecting said first toroidal segment from abrasion.

52. A wheel structure according to claim 50, wherein a portion of said tread is bonded to said first toroidal segment, or a portion thereof thereby protecting said first toroidal segment from abrasion.

* * * * *

UNITED STATES PATENT AND TRADEMARK OFFICE
CERTIFICATE OF CORRECTION

PATENT NO. : 4,350,196
DATED : September 21, 1982
INVENTOR(S) : William J. Hampshire It is certified that error appears in the above-identified patent and that said Letters Patent are hereby corrected as shown below:

Claim 1, line 57, change "$t_3$" to be --t--
       line 63, change "$t_2$ and $t_3$" to be --and $t_2$--
Claim 5, line 36, after "edge" insert --$t_4$--
Claim 8, line 48, insert --W,-- before "P"
Claim 11, line 65, insert --W,-- before "P"
       line 65, delete "$t_4$, $R_2$, $R_4$,"
Claim 12, line 10, insert --W,-- before "P"
       line 10, delete "$t_3$, $t_4$, $R_2$, $R_4$,"
Claim 13, line 23, insert --W,-- before "P"
Claim 14, line 36, insert --W,-- before "P"
       line 36, delete "$t_3$, $t_4$, $R_2$, $R_4$,"
Claim 15, line 41, delete "the edge"
       line 41, change "said hub disc" to be --the third toroidal segment--
       line 42, delete "hub"
Claim 16, line 45, delete "the edge"
       line 45, change "said hub disc" to be --the third toroidal segment--
       line 46, delete "hub."

UNITED STATES PATENT AND TRADEMARK OFFICE
CERTIFICATE OF CORRECTION

PATENT NO. : 4,350,196

DATED : September 21, 1982

INVENTOR(S) : William J. Hampshire

It is certified that error appears in the above-identified patent and that said Letters Patent are hereby corrected as shown below:

Claim 17, line 48, before "having" insert --which includes an edge element attached continuously and tangentially at one edge of the larger diameter of said first frustum, and--

Claim 18, line 55, before "having" insert --which includes an edge element attached continuously and tangentially at one edge of the larger diameter of said first frustum, and--

Claim 19, line 62, before "having" insert --which includes an edge element attached continuously and tangentially at one edge of the larger diameter of said first frustum, and--

Claim 20, line 1, before "having" insert, --which includes an element attached continuously and tangentially at one edge of the larger diameter of said first frustum, and--

Claim 31, line 8, insert --W,-- before "P"

line 2, change "$t_3$" to be --t-- line 8, change "$t_2$ and $t_3$" to be --and $t_2$--

UNITED STATES PATENT AND TRADEMARK OFFICE
CERTIFICATE OF CORRECTION

PATENT NO. : 4,350,196

DATED : September, 21, 1982

INVENTOR(S) : William J. Hampshire

Page 3 of 4

It is certified that error appears in the above-identified patent and that said Letters Patent are hereby corrected as shown below:

Claim 32, line 21, insert --W,-- before "P"

lines 21, 22, change "$t_3$, $t_4$, $R_2$ and $R_4$" to be --and $t_3$--

Claim 34, line 58, insert --W,-- before "P"

line 58, delete "$t_3$, $t_4$, $R_2$, $R_4$"

Claim 35, line 4, insert --W,-- before "P"

lines 4, 5, change "$t_3$, $t_4$, $R_2$ and $R_4$" to be --and $t_3$--

Claim 36, line 8, delete "the edge"

line 8, change "the hub disc" to be --the third toroidal segment-- line 9, delete "hub"

Claim 50, line 64, before "having" insert --which includes an edge element attached continuously and tangentially at one edge of the larger

UNITED STATES PATENT AND TRADEMARK OFFICE
CERTIFICATE OF CORRECTION

PATENT NO. : 4,350,196

DATED : September 21, 1982

INVENTOR(S) : William J. Hampshire

It is certified that error appears in the above-identified patent and that said Letters Patent is hereby corrected as shown below:

diameter of said frustum, and --.

Signed and Sealed this

Thirty-first Day of July 1984

[SEAL]

Attest:

*Attesting Officer*

GERALD J. MOSSINGHOFF

*Commissioner of Patents and Trademarks*